United States Patent [19]

Snider et al.

[11] 3,889,413
[45] June 17, 1975

[54] FISHING LINE JERKING DEVICE

[76] Inventors: Robert T. Snider, 1452 English, Indianapolis, Ind. 46201; Jessie G. Zimmerman, 1742 N. Rural, Indianapolis, Ind. 46218

[22] Filed: Jan. 4, 1974

[21] Appl. No.: 430,680

[52] U.S. Cl. ................................................. 43/15
[51] Int. Cl. ......................................... A01k 97/00
[58] Field of Search ........................................ 43/15

[56] References Cited
UNITED STATES PATENTS

| | | | |
|---|---|---|---|
| 796,948 | 8/1905 | Tuttle | 43/15 |
| 2,340,588 | 2/1944 | Groves | 43/15 |
| 2,689,426 | 9/1954 | Baenen | 43/15 |

*Primary Examiner*—Louis G. Mancene
*Assistant Examiner*—Daniel J. Leach
*Attorney, Agent, or Firm*—Woodard, Weikart, Emhardt & Naughton

[57] ABSTRACT

A device mountable to a fishing pole for jerking the fishing line immediately subsequent to a fish pulling the hook on the line. A first elongated element is pivotally mounted to a bracket mounted to the fishing pole. A second elongated element is pivotally mounted to the distal end of the first element and has a bottom hook shaped end engaged with a catch mounted to the fishing pole. A spring connected to the bracket and first element urges the distal end of the first element along with the second element in an upward direction. A second spring connected to the first and second element urges the hook shaped end of the second element against the catch but is yieldable when pressure is applied by the line to the top end of the second element to allow the second element to pivot thereby disengaging the hook shaped end from the catch. The first spring then pivots the first and second element upwardly thereby jerking the line.

2 Claims, 5 Drawing Figures

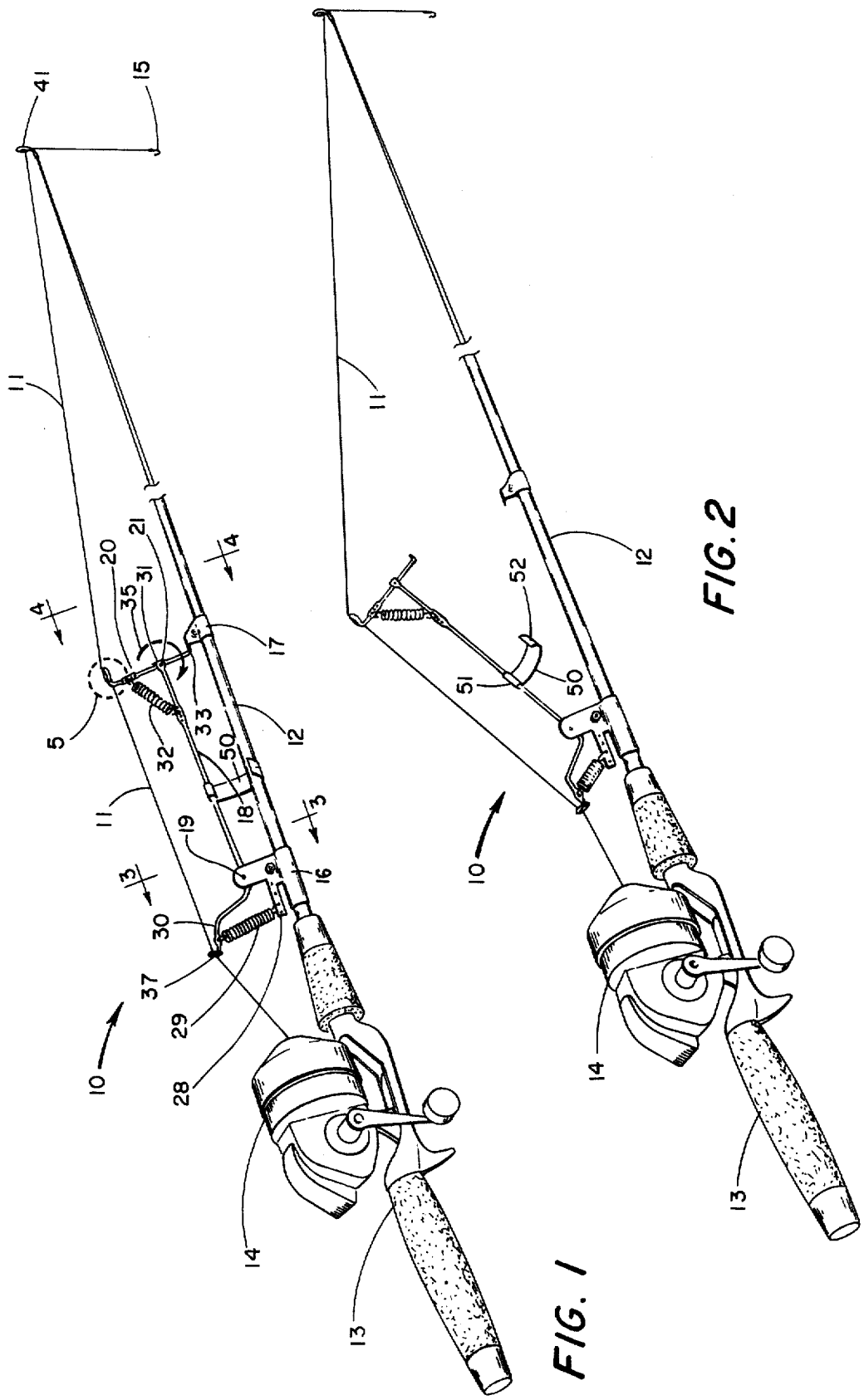

FISHING LINE JERKING DEVICE

BACKGROUND OF THE INVENTION

1. Field of the Invention

This invention is in the field of fishing pole attachments.

2. Description of the Prior Art

A number of U.S. patents have been granted for various types of fishing pole attachments which are utilized to automatically jerk the fishing line when a fish pulls the line. The following U.S. patents are of particular interest to the invention disclosed herein:

2,640,290 issued to E. R. Ames, et al;
2,821,804 issued to C. A. Smith;
2,850,831 issued to F. N. Setterdahl; and
3,457,665 issued to J. H. Duvall, et al.

Most of the prior art devices are relatively complex, requiring various types of plungers and movable interacting elements. As a result, the prior art devices are not only expensive but also frequently break or become inoperative due to component breakage as well as dirt and other foreign matter clogging the moving elements. Disclosed herein is a new and improved device for mounting to the fishing pole which will automatically jerk the line upon a fish pulling the line. The device disclosed herein is relatively inexpensive as compared to the prior art devices since a fewer number of components are utilized along with elimination of sliding movement between the components of the device. Likewise, the device disclosed herein may be mounted to a fishing pole in a relatively quick and easy manner and in addition is more reliable for jerking the fishing pole line due to the design and arrangement of the various components of the device.

SUMMARY OF THE INVENTION

One embodiment of the present invention is a device for jerking a fishing line on a fishing pole immediately subsequent to a fish pulling on the line comprising a bracket mountable on the pole, a catch mountable on the pole, a first elongated element pivotally mounted about a first pivot axis on the bracket and having a distal end, first means connected to the element biasing the distal end upwardly, a second elongated element pivotally mounted to the distal end, the second elongated element having an eyelet top slidably receiving the line and further having a hook bottom engaged with the catch, and second means connected to the second element operable to bias the hook bottom against the catch but yieldable to allow the second elongated element to pivot when the line through the eyelet top is pulled by a fish forcing the hook end away from the catch.

It is an object of the present invention to provide a new and improved device for jerking a fishing line immediately subsequent to a fish pulling on the line.

In addition, it is an object of the present invention to provide a fishing pole attachment for jerking the fishing line with the attachment being relatively easier and quicker to mount to the pole.

Related ojects and advantages of the present invention will be apparent from the following description.

BRIEF DESCRIPTION OF THE DRAWINGS

FIG. 1 is a perspective view of the device incorporating the present invention shown mounted to a fishing pole.

FIG. 2 is the same view as FIG. 1 only showing the device in the jerking position.

DESCRIPTION OF THE PREFERRED EMBODIMENT

Figure 3:
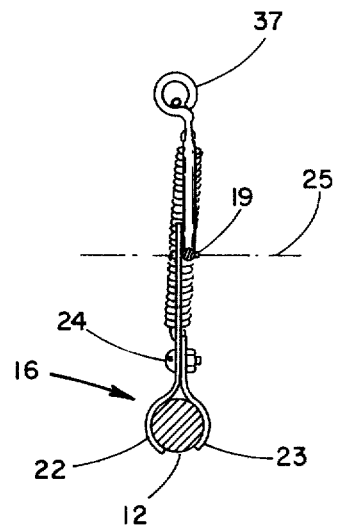
FIG. 3 is an enlarged cross sectional view taken along the line 3—3 of FIG. 1 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a device 10 for jerking a fishing line 11 on a fishing pole 12 immediately subsequent to a fish pulling line 11. Pole 12 is mounted to the traditional type of handle 13 having a fishing reel 14 mounted thereon. Line 11 extends from reel 14 through various eyelets mounted on pole 12 and into the water with a hook 15 attached thereto.

Figure 4:
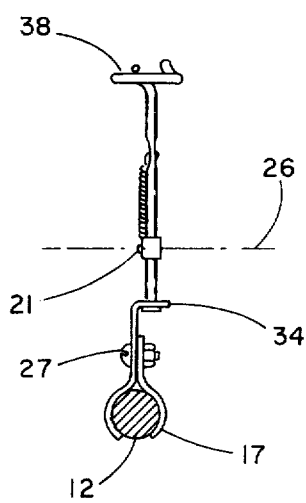
FIG. 4 is an enlarged cross sectional view taken along the line 4—4 of FIG. 1 and viewed in the direction of the arrows.

Device 10 has a bracket 16 (FIG. 3) and a catch 17 (FIG. 4) which are both mountable to a pole such as pole 12. A first elongated element 18 is pivotally mounted about a pivot axis extending horizontally through fastener 19 which pivotally secures element 18 to bracket 16. A second elongated element 20 is pivotally mounted by fastener 21 to element 18 with element 20 being pivotable about a horizontal pivot axis extending through fastener 21.

Bracket 16 (FIG. 3) includes a pair of clamps 22 and 23 secured together by fastening device 24. Clamps 22 and 23 are forced together so as to engage pole 12. Pivot axis 25 extends through fastener 19 whereas pivot axis 26 (FIG. 4) extends through fastener 21. Catch 17 is mounted to pole 12 in a manner identical to the mounting of bracket 16 and includes a fastener 27 securing the two clamps of catch 17 together.

Bracket 16 has a rearwardly extending portion 28 with the bottom end of helical spring 29 connected to portion 28. The top end of spring 29 is connected to the top end 30 of member 18 thereby urging the distal end 31 of element 18 along with element 20 in an upward direction. A second helical spring 32 has a bottom end connected to element 18 and a top end connected to element 20 thereby biasing the hook shaped bottom end 33 of element 20 against the hook shaped top end 34 of catch 17. End 33 of element 20 extends beneath the top end 34 of catch 17. Spring 32 is yieldable to allow element 20 to pivot in the direction of arrow 35 when the fish pulls on line 11 thereby forcing hook shaped end 33 away from catch 17. Spring 29 will then force element 20 upwardly causing line 11 to jerk thereby securing the fish to hook 15. FIG. 2 shows the device pivoted to the upward position.

Figure 5:
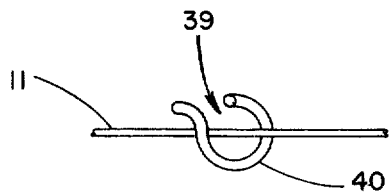
FIG. 5 is an enlarged plan view of the eyelet enclosed in circle 5 of FIG. 1.

Element 18 extends approximately parallel with pole 12 from pivot axis 25 to pivot axis 26. Element 18 extends rearwardly and upwardly from pivot axis 25 forming an eyelet 37 through which line 11 slides. The second element 20 when hooked to catch 17 extends upwardly from the catch to the eyelet top 38 which slidably receives line 11. Eyelet top 38 forms a vertically opening eyelet 39 (FIG. 5) having a top edge 40. Top edge 40 (FIG. 5) is located between eyelet 37 and the top end 41 (FIG. 1) of pole 12. Line 11 extends from reel 14 through eyelet 37 to a position beneath eyelet top 38 as shown in FIG. 1. The line then extends upwardly through eyelet 39 and over the top edge 40 of eyelet top 38. The line then extends downwardly through the eyelet mounted through the top end 41 of pole 12 to the fishing hook. As a result, when the fish pulls on line 11, the line is forced against top edge 40 thereby causing the second element 20 to pivot in the direction of arrow 35 disengaging catch 17. Catch 17 is located between the first pivot axis 25 and end 41 of the pole. Both the catch and bracket may be produced from sheet material.

Eyelet end 37 of element 18 is located between pivot axis 25 and handled end 13 of the pole. Eyelet 37 opens between horizontal and vertical when the hook shaped end 33 is engaged with catch 17. In the most upward position (FIG. 2), element 18 is at an angle less than 45° with respect to pole 12. With element 18 pivoted to the position shown in FIG. 2, eyelet 37 opens horizontally.

It will be obvious from the above description that the present invention provides a new and improved device for jerking a fishing line subsequent to a fish pulling on the line. It will also be obvious from the above description that the device disclosed herein may be readily mounted to a fishing pole.

Lock 50 has a top end 51 secured around member 18 and a bottom end 52 securable to pole 12. End 52 is secured to pole 12 only when the pole and apparatus are stored. End 52 is removed from pole 12 whenever the pole is in use.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are described to be protected.

The invention claimed is:

1. The combination of:
   a fishing pole including a handled end with reel mounted thereon and an opposite eyelet end, said reel having fishing line wrapped thereon and extending therefrom;
   a bracket mounted on said pole;
   a catch mounted on said pole between said bracket and said eyelet end of said pole;
   a first elongated element pivotally mounted about a first pivot axis on said bracket, said first elongated element having a distal end located between said first pivot axis and said eyelet end of said pole and further having a rearward portion extending between said handled end and said first pivot axis;
   a second elongated element pivotally mounted about a second pivot axis to said distal end of said first elongated element and having a bottom hook end engageable with said catch and further having a top end with an open eyelet formed thereon slidably receiving said line, said second elongated element being mounted to said first elongated element intermediate said top end of said second elongated element and said bottom hook end of said second elongated element;
   a first helical spring having a bottom end attached to said bracket between said first pivot axis and said handled end and further having a top end attached to said rearward portion of said first elongated element normally urging said rearward portion downwardly and said distal end and said second elongated element upwardly;
   a second helical spring with a bottom end attached to said first elongated element between said first pivot axis and said distal end and further having a top end attached to said second elongated element between said second pivot axis and said top end of said second elongated element, said second helical spring normally biasing said bottom hook end against said catch located between said bottom hook end and said eyelet end of said pole but yieldable to allow said second elongated element to pivot about said second pivot axis when said line extending through said eyelet of said second elongated element is pulled by a fish forcing said bottom hook end away from said catch and toward said bracket.

2. The combination of claim 1 wherein:
   said second elongated element extends vertical when engaged with said catch and said pole is extending horizontally, said eyelet of said second elongated element opens vertically when said second elongated element is engaged with said catch and includes a top edge, said fishing line extends upwardly through said open eyelet of said second elongated element and over said top edge and then downwardly through said eyelet end of said pole allowing pressure to be applied to said top edge when a fish pulls said line.

* * * * *